Figure 1:
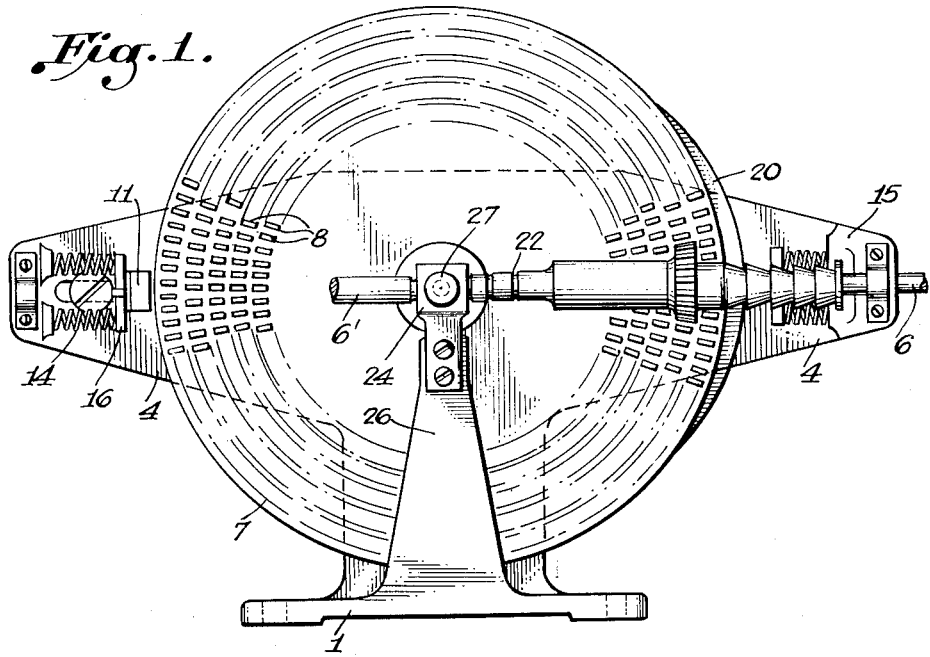

March 3, 1953      E. LEVIN      2,630,021

VARIABLE-SPEED GEAR

Filed July 11, 1947

Inventor,
ELIA LEVIN.

By
PATENT Agent

Patented Mar. 3, 1953

2,630,021

UNITED STATES PATENT OFFICE 2,630,021

VARIABLE-SPEED GEAR

Elia Levin, Tel Aviv, Palestine

Application July 11, 1947, Serial No. 760,250
In Great Britain May 10, 1945

Section 1, Public Law 690, August 8, 1946
Patent expires May 10, 1965

3 Claims. (Cl. 74—351)

Variable speed gears of the friction type, comprising two intersecting shafts, one of the shafts having fixed to it rotationally a relatively small disc adapted to be slid along, so as to make contact at any point on the diameter of a greater disc fastened on the second shaft, are well known. These gears make it possible to vary the ratio of velocity by infinitely small steps, but have several serious drawbacks. Since the drive is by means of friction between the discs, the latter have to be pressed together by force, which reacts on the bearings of the shafts. The discs have to be lined with leather or a fabric, which is easily worn out.

The present invention has for its object to provide a similar variable speed gear, but wherein the drive is transmitted by toothed discs and not by friction-discs. On the great disc there are arranged several concentric straight or helical toothed rims and on the shaft which intersects or nearly intersects the shaft of the great disc is slidable a toothed wheel or pinion adapted to be brought into engagement with any of the toothed rims. The teeth of all rims and of the pinion are of the same pitch and are so shaped that the teeth of the pinion can engage and be passed from one rim into the other rim, which of course have different numbers of teeth. In one or more positions of the disc there is in each rim a tooth or space between two teeth which falls into line with a tooth or space of teeth in a next following rim, so as to constitute an easy passage for the pinion from one rim into the next one. The teeth in the different rims neighbouring said line deviate from the latter only by a small amount and the easy passage is not disturbed even if the shifting takes place in the neighbourhood of said line, especially since the pinion is each time shifted for the short distance from one rim into the next rim only, this distance being shorter than the radial extension of the single teeth. The great disc may be the driving and the pinion the driven member or vice versa. Or there may be two pinions engaging in the same or in different rims of the great disc, in which case the latter transmits the movement or power from one pinion to the other.

It is a main feature of the invention that the shifting of the pinion from one toothed rim into the other is effected by the rotating great disc itself and not by hand. In the practical embodiment of the invention the shaft carrying the pinion is provided on both sides of the pinion with saw-like shaped racks directed towards the pinion and adapted to cooperate with manually engageable ratchets. The ratchets are normally retracted, but in the engaged position they are shifted across the disc by the rotating great disc for sliding the pinion on its shafts. They are returned in a reverse direction across the disc by springs provided to that effect.

The invention is illustrated in principle by way of example in the annexed drawing, in which Fig. 1 is an elevational view of a new gear with some parts broken away.

Figure 2:
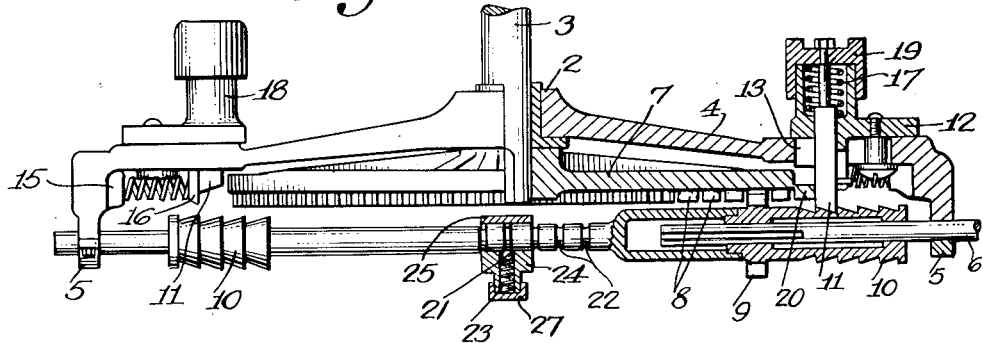

Fig. 2 is a plan view, partly in cross-section of the gear.

In the upper part of a housing of bracket 1 there is provided a bearing 2 in which is journalled a shaft 3. On both sides of the bearing 2 the bracket has wings 4 provided at their ends with bearings 5 for the intersecting two-part shaft 6, 6'. On the end of shaft 3 and between the wings 4 and shaft 6, 6' is keyed a great disc 7 provided with several toothed rims 8. On part 6' of the intersecting shaft is arranged the pinion 9. Part 6' is rotationally connected with part 6, but can slide with respect to each other in order to bring pinion 9 in mesh with the teeth of any of the several toothed rims 8 for changing the ratio of transmission. The concentric toothed rims are spaced from each other for a distance which is smaller than the width of the individual teeth of the rims.

The sliding of pinion 9 is done automatically in the following way: Shaft 6' is provided on both sides of the pinion with two circumferential racks 10. In the axial section the racks have a saw-like shape, the points of the teeth on both sides of the disc 7 being directed towards the middle of the latter. Ratchets 11 arranged in slides 12, guided in slots 13 of wings 4 can move in a direction parallel to shaft 6, 6'. Normally, the slides are held at the innermost end of the slots 13 by springs 14 located between projections 15, 16 of the wings 4 and the slides 12, respectively and the ratchets 11 are held out of engagement with the racks 10 by springs 17 accommodated in a cup 18 closed by a cover 19, screwed to the outer end of the ratchet. This ratchet device, hereinafter designated as steering mechanism, can be operated by hand or from afar by any self-acting control device, and brought into engagement with the rack 10, as seen in the right part of Fig. 2, but normally it is kept out of engagement, as indicated in the left part of this figure. Disc 7 has on its circumference a cam 20 which is adapted to push the ratchet for a distance between two rims 8, when the ratchet is in the said right position. If it is desired to bring pinion 9 into mesh with a rim of a greater diameter, then the said left ratchet is depressed, whereby cam 20 acts on the latter and moves shaft part 6' with pinion to the left. Instead of the cam electrical contacts can be provided on the disc 7 to close the circuit of an electromagnet adapted to shift the pinion.

Pinion 9 is locked in position against unintentional displacement by a spring pressed pin or ball 21 engaging in one of several circumferential grooves 22 provided on part 6'. Ball 21 and spring 23 pressing on it, are inserted in a bore of the cover 24 of a bearing 25 provided on the upper end of an arm 26 of the bracket 1, said bore being closed by a screwed on cup 27.

I am aware of the fact that in prior patent specifications variable speed gears have already been described and claimed wherein several concentric circular toothed rims of the same tooth pitch and a pinion slidable across the disc from one rim into the next following rim are provided. But in these known cases the teeth of the pinion are retractable and the pinion is slid by hand and only after said teeth have been retracted. In the present case a normal pinion with integral teeth can be used and the sliding movement of the pinion is effected by the rotating disc itself.

Having thus described the invention, what is claimed as new and desired to be secured by Letters Patent, is:

1. Variable speed gear comprising two perpendicular shafts, one shaft carrying a disc having concentric circular toothed rims of the same tooth pitch and spaced from each other in the radial direction for a length smaller than the width of the individual teeth of the rims, the other shaft carrying a pinion slidable across the disc from one rim into the next following rim, there being provided in each rim a space between two teeth which falls in line with a space between two teeth in a next following rim, so as to create an easy passage for the pinion, and power driven means being provided for sliding the pinion around said line from one rim into the next one.

2. Variable speed gear comprising two perpendicular shafts, a bracket in which the two shafts are journalled, one shaft carrying a disc having concentric circular toothed rims of the same tooth pitch and spaced from each other in the radial direction for a length smaller than the length of the individual teeth of the rims, the other shaft carrying a pinion with teeth of a like width slidable across the disc from one rim into the next following rim, there being provided in each rim a space between two teeth which falls into line with a space between two teeth in a next following rim, so as to create an easy passage for the pinion, racks on said second shaft attached to said pinion, ratchets movable in the bracket for bringing the ratchets into engagement with said racks, and power driven means provided to actuate the engaged ratchet and to shift thereby the pinion and throw it into a next following rim.

3. Variable speed gear comprising two perpendicular shafts, one shaft carrying a disc having concentric circular toothed rims of the same pitch and spaced from each other in the radial direction for a length smaller than the length of the individual teeth of the rims, the other shaft carrying a pinion with teeth of a like width slidable across the disc from one rim into the next following rim, there being provided in each rim a space between two teeth which falls in line with a space between two teeth in a next following rim, so as to create an easy passage for the pinion, racks attached to said pinion on either side of the latter, ratchets cooperating with the racks, power operated means for actuating one of said racks by a respective ratchet to thereby slide the pinion to engagement position with the next following rim, and a spring pressed locking device preventing unintentional shifting of the pinion.

ELIA LEVIN.

REFERENCES CITED

The following references are of record in the file of this patent:

UNITED STATES PATENTS

| Number | Name | Date |
| --- | --- | --- |
| 705,880 | Storrs | July 29, 1902 |
| 803,554 | Case | Nov. 7, 1905 |
| 913,623 | Dallison | Feb. 23, 1909 |
| 944,978 | Temple | Dec. 28, 1909 |
| 978,877 | Grimes | Dec. 20, 1910 |
| 1,410,747 | Gill | Mar. 28, 1922 |

FOREIGN PATENTS

| Number | Country | Date |
| --- | --- | --- |
| 17,217 | Great Britain | July 31, 1906 |